United States Patent [19]
Orlitzky

[11] Patent Number: 5,667,037
[45] Date of Patent: Sep. 16, 1997

[54] LUBRICATION SYSTEM

[76] Inventor: Anton Orlitzky, 343 Rosehill Wynd, Delta, B.C., Canada, V4M 3L8

[21] Appl. No.: 554,044

[22] Filed: Nov. 6, 1995

[51] Int. Cl.$^6$ .................................................. F16N 11/10
[52] U.S. Cl. ............................ 184/39; 184/40; 184/108
[58] Field of Search ........................ 184/39, 39.1, 40, 184/41, 42, 7.4, 108, 29

[56] References Cited

U.S. PATENT DOCUMENTS

| | | | |
|---|---|---|---|
| 1,561,308 | 11/1925 | Brown | 184/39.1 |
| 1,878,115 | 9/1932 | De Cosse | 184/39.1 |
| 4,671,386 | 6/1987 | Orlitzky | 184/39 |
| 5,285,571 | 2/1994 | Slevenpiper | 184/7.4 |
| 5,404,966 | 4/1995 | Yang | 184/108 |
| 5,409,084 | 4/1995 | Graf | 184/39 |
| 5,417,308 | 5/1995 | Hartl | 184/108 |

Primary Examiner—Thomas E. Denion
Attorney, Agent, or Firm—Fulwider Patton Lee & Utecht, LLP

[57] ABSTRACT

A lubrication system. There is an oil reservoir having a first inlet for oil and at least one outlet. A piston in the reservoir forces oil from the reservoir. There is a second inlet in the reservoir on a side of the piston remote from the outlet. Pressure can be exerted through the second inlet to urge the piston towards the reservoir to force oil from the outlet.

7 Claims, 2 Drawing Sheets

LUBRICATION SYSTEM

FIELD OF THE INVENTION

This invention relates to a lubrication system.

PRIOR ART

Lubrication is vital for machinery. Lubrication facilitates the movement of parts that contact each other and also acts to dissipate heat.

It can be difficult to provide proper lubrication. In the case of moving machinery it can be dangerous. The machinery can also be inaccessible. Furthermore human error can occur. That is to say required lubrication is not carried out according to a set plan.

Applicant has invented electrical driven lubrication equipment that provides continuous lubrication. The equipment, generally available under the trademark Electroluber, has, in a preferred embodiment, a reservoir, preferably translucent, to hold the lubricant. The reservoir has an outlet. There is a diaphragm at the top of the lubricant reservoir or, in preferred embodiments, a piston that can be driven by an expandable bellows. Above the diaphragm or bellows is an electrochemical cell that includes an electrolyte. Batteries are housed in a chamber above the electrolyte and switches, resistors and an electronic board are operated by the batteries. These components are used to control the rate of reaction in the electrochemical cell. The action is one that generates a gas from the electrolyte. In a preferred embodiment the gas is nitrogen as nitrogen has the advantage of being chemically inert.

To use applicant's prior art equipment the appropriate, selected switches are closed to allow the batteries to start the reaction in the electrochemical cell. The nitrogen in the bellows acts to force the bellows downwardly. This moves the piston downwardly to force the lubricant out of the lubricant reservoir, and through the outlet. The lubricant outlet is easily connected, typically by a threaded connection, to a piece of machinery that needs to be lubricated, for example, a bearing. By closing a different number of switches the strength of the electric current can be varied and thus the amount of gas produced. The more gas produced the greater the rate of lubricant flow under the greater pressure. Of course the duration of operation is reduced. The less gas developed, the longer the duration.

The dispenser typically includes a light, referred to as a blip light, that flashes to indicate that the system is in working order.

This equipment has received excellent acceptance. It has a number of marked advantages. It is reliable. It can work for up to one year in all sorts of adverse conditions. The rate of chemical reaction, and thus the rate of expression of lubricant, can be varied to meet conditions. Furthermore that rate can be varied during operation. Continuous feed of a small amount of lubricant tends to push out contaminants from a bearing. With more conventional lubrication, for example by an operator with a grease gun, the contaminants are not moved out until the fresh grease is applied. With applicant's prior art equipment a constant flow is achieved. The disadvantage of contaminants not being pushed out is accentuated by the fact that cooling of a bearing causes contraction and thus a tendency to develop a slight vacuum. In these circumstances foreign matter may be drawn into the bearing. However with the prior art dispenser of applicant positive pressure is always applied so that the drawing in of contaminants does not take place.

Localized use of lubricant can take place using conventional systems and this is avoided with a constant supply of lubricant. Furthermore the cooling effect of a lubricant is improved by the constant application of fresh lubricant.

As indicated, and as the result of the above advantages, this equipment has found use all over the world. It is used on railways, conveyors, in pumps, in mines, on motors, on motor operated valves, on all sorts of bearings and in all sorts of locations.

The above equipment is, for example, described and claimed in U.S. Pat. Nos. 4,023,648 and 4,671,386. The disclosures of these patents are incorporated specifically herein by reference.

The above equipment is designed to grease with a fairly heavy grease, for example grease suitable for bearings. But there is a need for constant lubrication with oil. Typically lubrication in this manner is achieved by a drip of oil at regular intervals.

SUMMARY OF THE PRESENT INVENTION

The present invention seeks to provide apparatus that capitalizes on the marked advantage of equipment similar to applicant's above equipment. However, whereas applicant's prior art equipment applies grease, the present invention seeks to provide a lubricating oil to a required location. The invention permits the feeding of quite large quantities of lubricant whereas the prior art equipment is essentially useful for the application of relatively small volumes of grease.

In general the equipment provides a drip of oil, up to about 1500W, or light grease such as gear grease.

Accordingly, and in a first aspect, the present invention is a lubrication system comprising:

an oil reservoir having a first inlet for oil and at least one outlet;

a piston in said reservoir to force oil from the reservoir;

a second inlet in said reservoir on a side of the piston remote from said at least one outlet;

means to exert pressure through said second inlet to urge said piston towards the reservoir to force oil from the at least one outlet.

DESCRIPTION OF PREFERRED EMBODIMENTS

Figure 1:
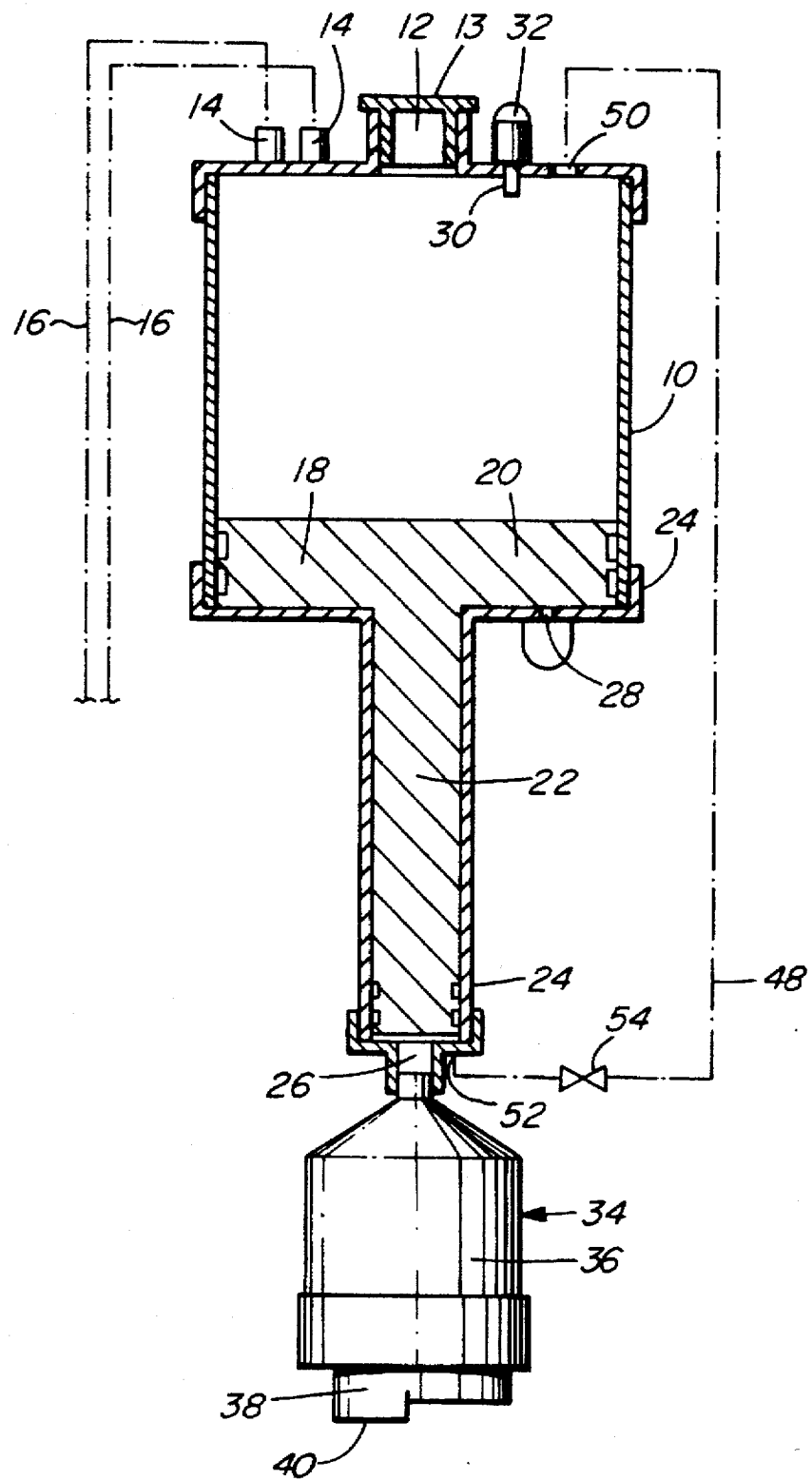
FIG. 1 is a schematic view of apparatus according to the present invention.

FIG. 1 shows a lubrication system comprising an oil reservoir 10 having a first inlet 12 for oil with closure 13 and two outlets 14. The outlets 14 are connected to oil lines 16 and from those oil lines 16 oil may be fed, usually by drip, to a bearing or to any other equipment requiring lubrication. There is a piston 18 in reservoir 10 to force oil from the reservoir 10. In the illustrated embodiment the piston has a wider portion 20 and a narrower portion 22. The piston 18 is provided with piston rings 24 as necessary.

There is a second inlet 26 in the reservoir 10 on that side of the piston 18 remote from the outlets 14. The reservoir 10 includes a vent 28 to allow ingress of air so that movement of the piston 18 is not restricted by the development of a vacuum beneath the lower surface of the wider portion 20 of the piston 18 as the piston 18 moves upwardly.

The oil reservoir 10 is shown having a limit switch 30 on its upper surface. The limit switch 30 operates an alarm 32. A flashing light is illustrated but alarm 32 may, of course, be replaced by any traditional alarm.

Figure 2:
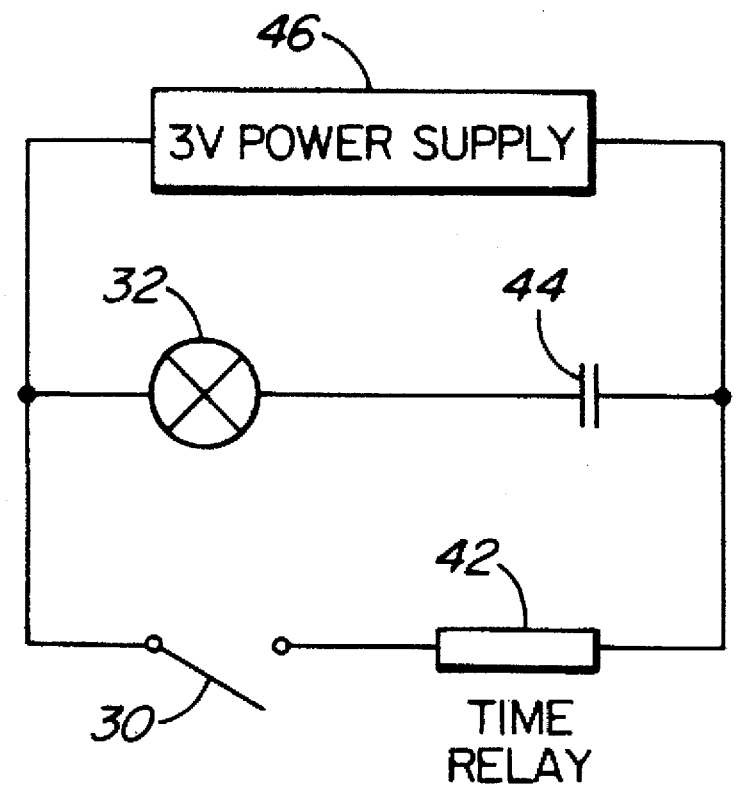
FIG. 2 illustrates a timing circuit useful in the apparatus of FIG. 1.

FIG. 2 shows a timing circuit that may be operated by switch 30. There is time relay 42, a switch 30 and a delay switch 44, typically with a delay of about 3 seconds. There is a power supply 46.

The narrower portion of the oil reservoir 10 may include calibrations so that the movement of the piston 18 may be determined and thus the rate of feed of the oil.

There is means to exert pressure through the second inlet 26 to urge the piston 18 towards the outlets 14 to force oil from the outlets 14. Although illustrated somewhat schematically in the preferred embodiment the means to exert the pressure comprises an apparatus 34 having a chamber 36 containing a fluid and in communication with second inlet 26. There is a means to generate a gas to develop the required pressure. The apparatus is not shown in great detail in the drawings. It does not form part of the present invention. However there is a piston within the chamber 36 and there is an electrolytic chamber on that side of the piston remote from the second inlet 26. An upper section 38 includes batteries, typically of 1.5 volts, that apply potential to the electrolytic chamber to induce chemical reaction in the electrolyte. Typically the chemical reaction will generate nitrogen. There are switches that can be set to control the rate of chemical reaction by controlling the voltage applied to the electrolytic cell. The switches are accessed through cap 40. As indicated previously details of the structures may be found, for example, in U.S. Pat. Nos. 4,023,648 and 4,671,386 discussed above and incorporated herein by reference.

Chamber 36 is preferably filled with the same oil that is being fed by the apparatus through outlets 14 to oil line 16. There is a feedback line 48 able to feed oil from an outlet 50 in the top of reservoir 10 to an inlet 52 in the base of reservoir 10. Line 48 is controlled by valve 54.

The equipment operates as follows. First the closure 13 is removed from the reservoir 10. The piston 18 is retracted to the position shown in FIG. 1 and the oil reservoir 10 filled with oil through the inlet 12. Chamber 36 is filled with the same oil. Valve 52 is closed.

The switches in the apparatus 34 are operated to achieve the appropriate rate of chemical reaction and thus the appropriate rate of expulsion of oil. It is well within the capability of the equipment to allow complete emptying of the reservoir 10 within 15 days or within one year. As gas pressure is developed within the chamber 36 of the apparatus 34 piston 18 is moved upwardly in the oil reservoir 10. Air can enter the reservoir 10 through the vent 28 so that movement forward of the piston 18 is not impeded. The piston 18 continues to move until nearly all the oil is expelled from the oil reservoir 10. At that point the upper surface of the piston 18 contacts the switch 30 to operate the alarm 32, through the circuit of FIG. 2, to indicate that the oil reservoir 10 is nearly empty.

At that time the apparatus 34 may be switched off and removed from the reservoir 10. Inlet 36 is closed and valve 52 is opened. The piston 18 is moved downwardly within the oil reservoir 10. This acts to force oil from beneath the piston 18 to above the piston 10. That oil was, of course, previously within chamber 36. Further oil is introduced into reservoir 10, valve 52 is closed and a new apparatus 34 is attached to inlet 26 of oil reservoir 10. The apparatus is then ready for reuse.

The equipment of the present invention is simple, durable and economically in use. It requires negligible attendance while in use, that is, it forms an independently operating lubrication system. It can feed about two liters of oil over a broad range of times, for example 15 days to one year, depending on the controls of apparatus 34, easily set by the user. The rate of use can be observed by reading the calibrations on the narrow part of reservoir 10. Adjustment may be made to the controls of apparatus 34 to speed or slow gas evolution and thus the rate of expulsion of oil from outlets 34. As indicated the volume of reservoir 10 may be about 2 liters; the volume of chamber 36 is about 125 mls.

Although the present invention has been described in some detail by way of example for purposes of clarity and understanding, it will be apparent that certain changes and modifications may be practised within the scope of the appended claims.

I claim:

1. A lubrication system comprising:

an oil reservoir having a first inlet for oil and at least one outlet;

a piston in said reservoir to force oil from the reservoir;

a second inlet in said reservoir on a side of the piston remote from said at least one outlet;

means to exert pressure through said second inlet to urge said piston towards the reservoir to force oil from the at least one outlet;

a feed back line to feed oil from the reservoir, from the same side of the piston as the at least one outlet, to that side of the piston on the same side as the second inlet; and a valve to open and close said feed back line.

2. A system as claimed in claim 1 in which the reservoir has a wide portion and a narrow portion, the inlet for oil being in the wide portion and the second inlet in the narrow portion.

3. A system as claimed in claim 1 in which the piston has sealing rings.

4. A system as claimed in claim 2 in which the narrow portion of the reservoir is calibrated to indicate movement of the piston.

5. A system as claimed in claim 1 including a limit switch adjacent said at least one outlet whereby, when the reservoir approaches empty the switch is operated to operate an alarm.

6. A system as claimed in claim 5 in which the alarm is a flashing light.

7. A system as claimed in claim 1 in which the means to exert pressure comprises an apparatus having a chamber in communication with said second inlet;

means to generate a gas in communication with said chamber to develop the required pressure.

* * * * *